United States Patent [19]

O'Keeffe

[11] Patent Number: 4,463,497

[45] Date of Patent: Aug. 7, 1984

[54] OFFSET SNIPS

[75] Inventor: James R. O'Keeffe, Hastings, Nebr.

[73] Assignee: Prosnip Corporation, Dewitt, Nebr.

[21] Appl. No.: 386,049

[22] Filed: Jun. 7, 1982

[51] Int. Cl.$^3$ ............................................. B26B 13/26
[52] U.S. Cl. ...................................... 30/252; 30/259
[58] Field of Search ................. 30/252, 259, 266, 254, 30/226, 250, 175, 176, 267; 76/104 A; 7/130, 131

[56] References Cited

U.S. PATENT DOCUMENTS

| 540,464 | 6/1895 | Stockmann . | |
| 894,710 | 7/1908 | Selley . | |
| 942,043 | 11/1909 | Searight | 30/251 |
| 1,436,603 | 11/1922 | Philbert | 30/258 |
| 1,632,284 | 6/1927 | Gardiner | 30/257 |
| 2,078,585 | 4/1937 | Rauh | 30/254 |
| 2,163,088 | 6/1939 | Grant | 30/258 |
| 2,264,840 | 12/1941 | Isaac | 30/254 |
| 2,286,874 | 6/1942 | Schwartz | 76/104 |
| 2,307,457 | 1/1943 | Franko | 30/257 |
| 2,395,897 | 3/1946 | Kethcart | 30/230 |
| 2,579,521 | 12/1951 | Sorensen | 30/230 |
| 2,690,010 | 9/1954 | Keller | 30/252 |
| 2,766,526 | 10/1956 | Pape | 30/251 |
| 2,803,058 | 8/1957 | Mead | 30/252 |
| 2,869,235 | 1/1959 | Klenk | 30/252 |
| 2,908,076 | 10/1959 | Veith | 30/227 |
| 2,931,100 | 4/1960 | Wertepny | 30/258 |
| 3,143,799 | 8/1964 | Gover | 30/259 |
| 3,461,555 | 8/1969 | Bliznak | 30/254 |
| 3,587,173 | 6/1971 | Hexdall | 30/251 |
| 3,678,580 | 7/1972 | Duffy | 30/267 |
| 3,740,846 | 6/1973 | Duffy | 30/267 |

FOREIGN PATENT DOCUMENTS 64977 3/1892 Fed. Rep. of Germany .

OTHER PUBLICATIONS

Midwest Tool and Cutlery Company Catalog (NPC82/1436) illustrating Aviation Snips (4 pages).
Ernst Diener Catalog, Brochures and Pricing Sheet (13 pages) dated Feb. 15, 1975, Feb. 16-19, 1976, and '68 (1968) illustrating Erdi or Diener offset Snips Model 27A.

Primary Examiner—Jimmy C. Peters
Attorney, Agent, or Firm—Lackenbach Siegel Marzullo Presta & Aronson

[57] ABSTRACT

First and second blade members have pivot bosses through which the blade members are pivotably connected for rotation about an axis perpendicular to the pivot bosses. The blade members have cutting surfaces offset with respect to the pivot bosses to permit previously cut material to pass the blade members without interference. The cutting surfaces are rotatable between an open position and a closed position for cutting the sheet material therebetween. The pivot bosses and the cutting surfaces are adapted for removal of material therefrom to permit resharpening of the offset snips while maintaining the offset of the cutting surfaces. One of the blade members may include a recess to permit cutting of both left-hand and right-hand curves. Integral wire cutting means, integral locking means, and an improved handle configuration are also provided.

21 Claims, 9 Drawing Figures

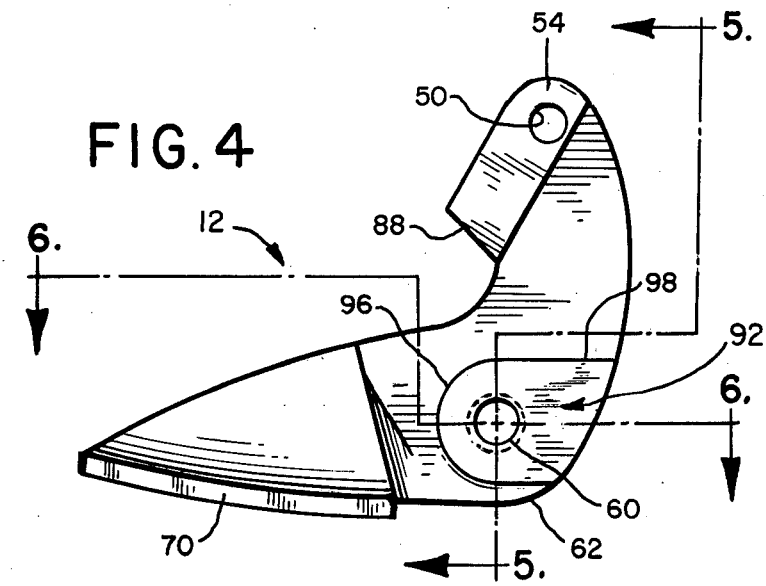
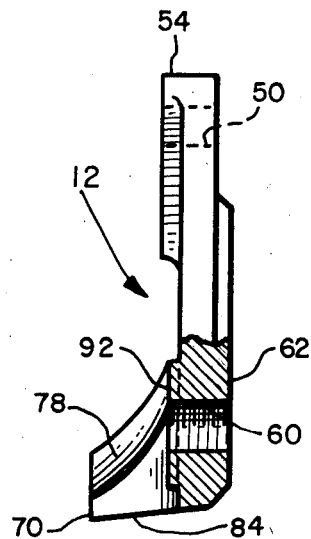
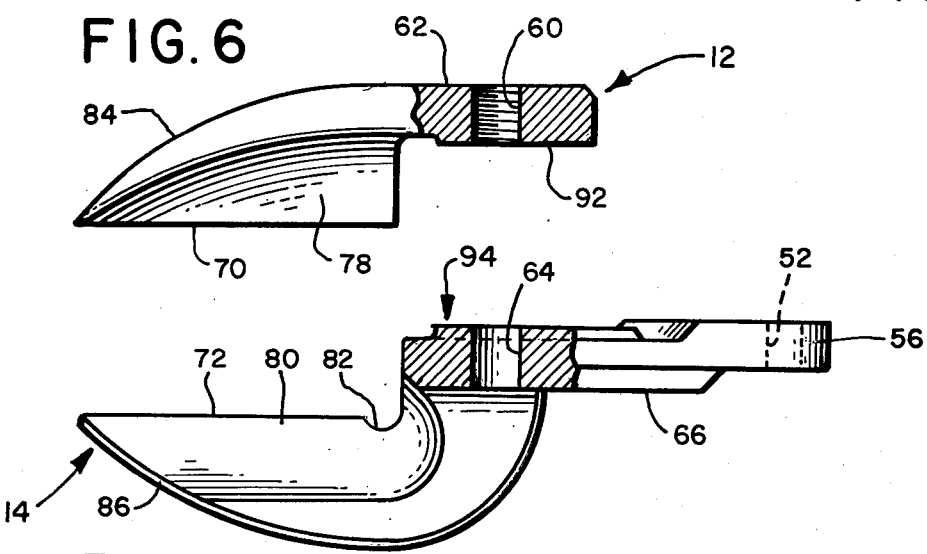
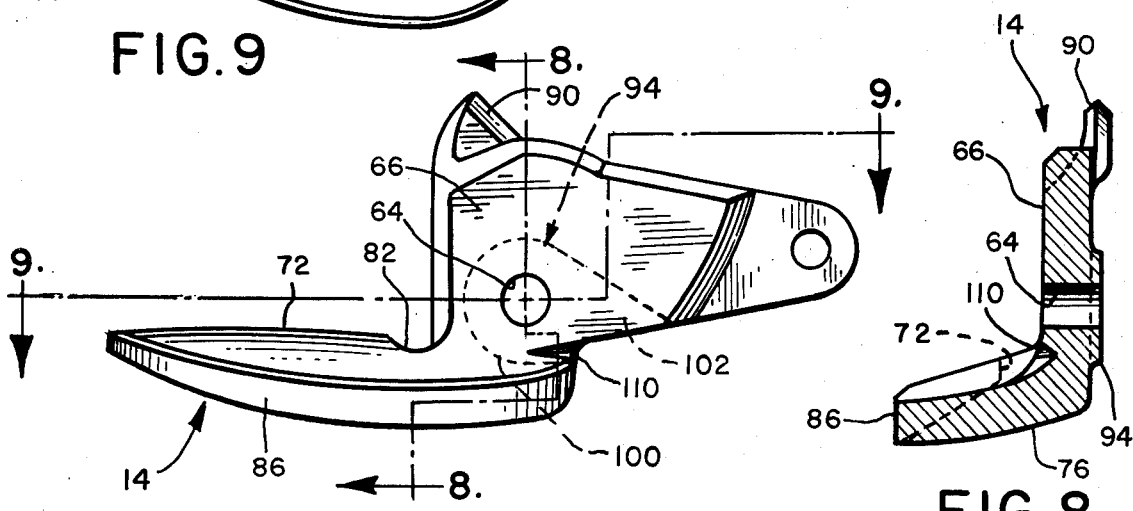

OFFSET SNIPS

BACKGROUND OF THE INVENTION

The present invention relates to hand operated offset shears or snips for cutting sheet material.

When sheet metal or similar material is cut with conventional snips, one or both edges of the cut sheet material may interfere with the body of the snips, making it difficult to advance the snips into the sheet material and distorting the cut edges. This interference is greatest when cutting irregular shapes. Accordingly, conventional snips are often supplied in mirror image configurations particularly adapted for either left-hand or right-hand turning cuts. Also, when conventional snips are used to cut thick, tough or stiff material, the sheet material may tend to slide away from the blades as they are closed, decreasing the efficiency of the cutting. Further, conventional snips may require long handles and substantial force to be exerted by the operator in order to cut many sheet materials.

As illustrated by U.S. Pat. No. 2,264,840, one approach to decreasing the interference of the cut sheet material with the body of the snips is to offset the cutting surfaces with respect to the shank portions of the snips such that the cut sheet material passes to one side of the shank portions. Also illustrated therein is the practice of extending the cutting blades laterally approximately at right angles to the plane of operation of the shanks. This configuration facilitates the advancement of the snips into the sheet material by reducing the extent to which the cut sheet material must be spread vertically to pass above and below the lower blade, thereby decreasing the tendency of the sheet material to slide away from the cutting surfaces. More recently, a link arrangement, as shown in U.S. Pat. No. 3,587,173, has been proposed to reduce the force required by the operator to cut heavy sheet materials.

As with conventional snips, available offset snips generally can be used only in cutting curves either in the left-hand or right-hand direction, thus requiring other offset snips having a mirror image configuration when curves must be made in the other direction. The laterally extending blades of available offset snips must be carefully ground and aligned during manufacture and, generally, cannot be conveniently reground if they become dull or damaged. Abuse of the blades by cutting wire or similar materials may render the snips useless for cutting sheet material. Accordingly, a need exists for improved offset snips which can be easily resharpened if the blades become dull or damaged. Further, there is a need for an improved handle configuration making the offset snips more convenient to use when cutting heavy sheet material.

It is therefore an object of the present invention to provide improved offset snips which can cut sheet material in both left-hand and right-hand curves without being impeded by interference of the cut material with the body of the snips.

It is a further object of the present invention to provide improved offset snips in which the cutting surfaces may be conveniently and economically resharpened if the cutting surfaces become dull or damaged.

It is a further object of the present invention to provide improved offset snips having means for cutting wire and the like, thereby eliminating the need for a second tool and reducing abuse of the sheet material cutting surfaces of the offset snips.

It is a further object of the present invention to provide improved offset snips having locking means for conveniently locking the offset snips in a closed position when the offset snips are not in use.

It is still a further object of the present invention to provide improved offset snips having handles which can more easily be grasped when the snips are in the open position and more easily forced to the closed position.

SUMMARY OF INVENTION

The present invention is directed to improvements in hand operated shears or snips for cutting sheet material.

According to one aspect of this invention, first and second blade members have pivot bosses through which a pivot means pivotably connects the blade members for rotation about an axis perpendicular to the pivot bosses. The respective blade members have first and second cutting surfaces which are offset with respect to the plane of the respective pivot bosses. Upon rotation of the blade members about the pivot means, the first and second cutting surfaces are moveable between an open position and a closed position for cutting sheet material therebetween. The pivot bosses and the cutting surfaces are adapted for removal of material therefrom so as to provide resharpened cutting surfaces while maintaining the offsets between the respective pivot bosses and the cutting surfaces. The offsets of the cutting surfaces with respect to the pivot bosses can be sufficient to permit previously cut material to pass the blade members without interference.

According to a second aspect of this invention, first and second blade members are pivotably connected through shank portions, one of the shank portions being provided with a recess substantially in the plane of the sheet material to be cut. The respective blade members have first and second cutting surfaces which are offset with respect to the shank portions and which are movable upon rotation between an open position and a closed position for cutting the sheet material therebetween. A cut edge of the cut sheet material is receivable in the recess so as to permit cutting of the sheet material along both left-hand and right-hand curves. As a result, the offset snips of the present invention are "universal," eliminating the need for separate right-hand and left-hand snips when irregular cuts are required.

According to another aspect of this invention, the handles are pivotable to provide particularly favorable leverage throughout the cutting stroke. Other aspects of this invention include an integral cutting means suitable for cutting wire and an integral locking means for maintaining the cutting blades in the closed position. The invention, together with further objects and attendant advantages, will be best understood by reference to the following detailed description taken in conjunction with the accompanying drawings.

BRIEF DESCRIPTION OF THE DRAWINGS

FIG. 1 is a side elevational view of a preferred embodiment of the offset snips of the present invention shown in the open position and with portions broken away;

FIG. 2 is a side elevational view of the offset snips of FIG. 1 shown locked in the closed or cutting position and with portions broken away;

FIG. 3 is a sectional view of the offset snips of FIGS. 1 and 2 taken along the line 3—3 of FIG. 2;

FIG. 4 is a side elevational view of the upper cutting blade of the offset snips of FIGS. 1-3;

FIG. 5 is a sectional view of the upper cutting blade of the offset snips of FIGS. 1-3 taken along the line 5—5 of FIG. 4;

FIG. 6 is a sectional view of the upper cutting blade of the offset snips of FIGS. 1-3 taken along the line 6—6 of FIG. 4;

FIG. 7 is a side elevational view of the lower cutting blade of the offset snips of FIGS. 1-3;

FIG. 8 is a sectional view of the lower cutting blade of the offset snips of FIGS. 1-3 taken along the line 8—8 of FIG. 7; and FIG. 9 is a sectional view of the lower cutting blade of the offset snips of FIGS. 1-3 taken along the line 9—9 of FIG. 7.

DETAILED DESCRIPTION OF THE PREFERRED EMBODIMENT

Figures 1, 2, 3:
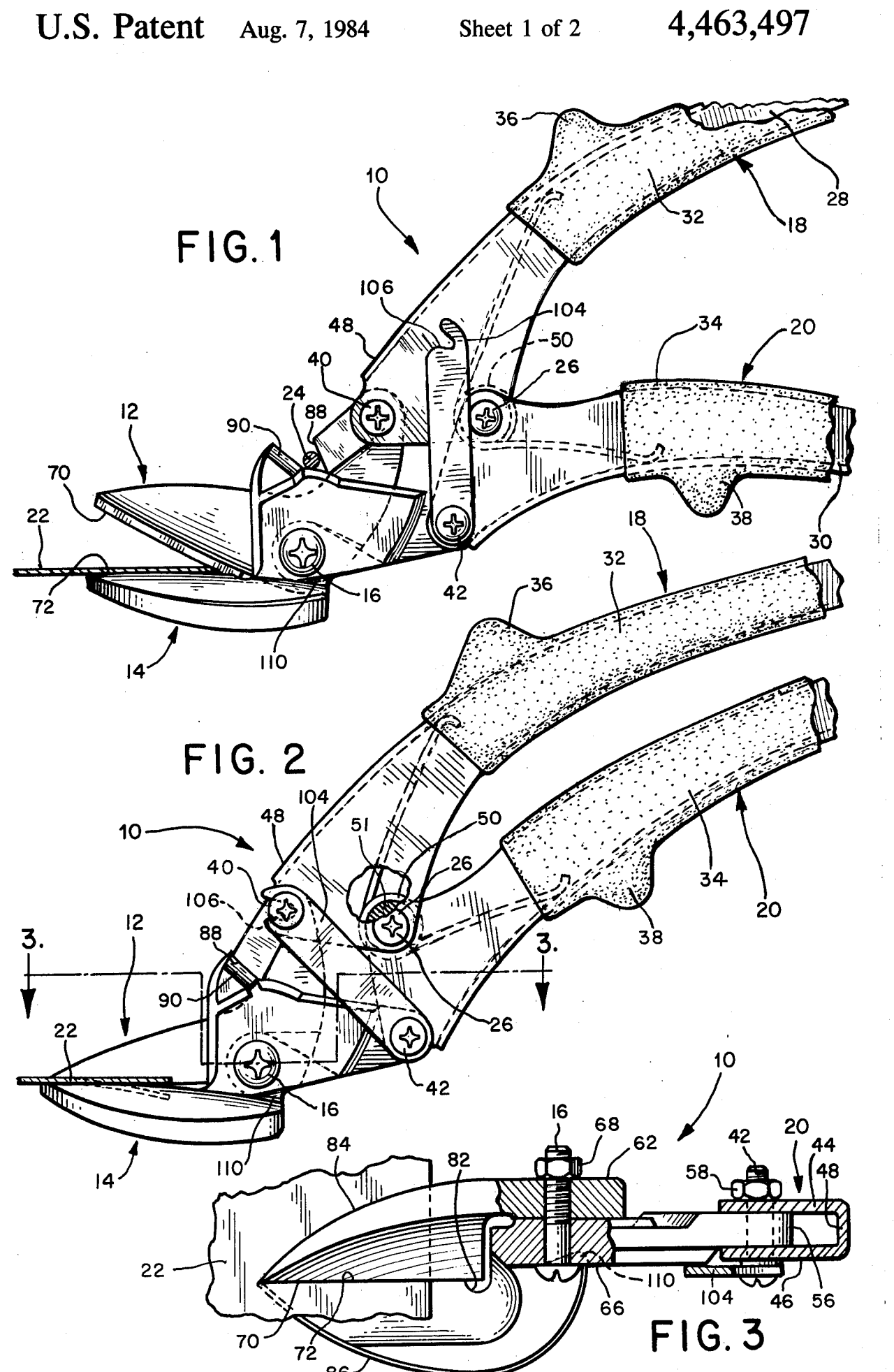

With reference to the drawings, a preferred embodiment of offset snips made in accordance with the present invention is indicated generally by the numeral 10 in FIGS. 1-3. The cutting snips 10 include upper and lower blade members, indicated generally by the numerals 12 and 14, respectively, which are pivotably moveable about a main pivot bolt 16 by upper and lower handles, indicated generally by the numerals 18 and 20, respectively. Movement of the blade members 12 and 14 between the open position shown in FIG. 1 and the closed position shown in FIG. 2 effects cutting of a sheet material workpiece 22 or a wire workpiece 24 positioned between the blade members 12 and 14, as shown in FIG. 1.

The handles 18 and 20 are pivotably moveable about a handle pivot bolt 26 located intermediately of the ends of the handles 18 and 20. The rearward portions 28 and 30 of the respective handles 18 and 20 are covered with upper and lower hand grips 32 and 34, respectively. Preferably, the hand grips 32 and 34 are formed by dipping or molding so as to include outwardly projecting ear portions 36 and 38, respectively, to prevent the hand of the operator from sliding forward during use of the cutting snips 10. The preferred material for the hand grips 32 and 34 is a hot-dip plastisol such as that commercially available from Sinclair Rush of St. Louis, Mo.

The handles 18 and 20 extend forward from the handle pivot bolt 26 and away from each other for pivotable mounting to the blade members 12 and 14 at pivot bolts 40 and 42, respectively. In the open position shown in FIG. 1, an acute angle is, preferably, formed between an imaginary line joining the pivot bolts 26 and 40 and an imaginary line joining pivot bolts 26 and 42. Preferably, the handles 18 and 20 have a U-shaped cross-section, as shown in FIG. 3, formed by laterally spaced side portions 44 and 46 joined by a web portion 48. An omega spring 50, held in place by the handle pivot bolt 26, engages the web portion 48 of the handles 18 and 20 to bias the cutting snips 10 into the open position. Other biasing means could be employed with similar effect. A sleeve 51 is positioned between the handle pivot screw 26 and the omega spring 50 to center and space the omega spring 50 with respect to the handle pivot screw 26. Although the sleeve 51 is not essential to the operation of the cutting snips 10, Applicant has found that the sleeve 51 substantially extends the cycle life of the omega spring 50.

In the open position, the upper blade member 12 extends upward and rearward from the main pivot bolt 16 to a pivotable mounting upon the pivot bolt 40, as shown in FIG. 1. The lower blade member 14 extends rearward from the main pivot bolt 16 to a pivotable mounting upon the pivot bolt 42. In response to the closing of the handles 18 and 20, the pivot bolts 40 and 42 are rotated about the handle pivot bolt 26, thereby spreading the rearward portions 54 and 56 of the blade members 12 and 14. As illustrated in FIG. 3, the rearward portions 54 and 56 have sufficient thickness to be closely received by the side portions 44 and 46 of the handles 18 and 20 so as to maintain alignment of the upper and lower cutting blades 12 and 14. Adjustment of the play between the side portions 44 and 46 and the rearward portions 54 and 56 is provided by adjustment nuts 58 upon the pivot bolts 40 and 42.

The main pivot bolt 16 is threaded into a hole 60 in the shank portion 62 of the upper blade member 12 and forms a sliding fit with a hole 64 within the shank portion 66 of the lower blade member 14. A lock nut 68 is locked against the shank portion 62 to maintain the adjusted length of the main pivot bolt 16. Cutting surfaces 70 and 72 of the cutting blades 12 and 14, respectively, are within a plane substantially parallel to but offset laterally from the adjoining shank portions 62 and 66 of the respective blade members, as shown in FIG. 3. It will be noted that the offset is sufficient to permit a cut portion of the sheet material workpiece 22 to pass to the side of the shank portion 66.

Applicant has found that the cutting of the sheet material workpiece 22 is enhanced if the cutting surfaces 70 and 72 are curved in side elevation, as shown in FIGS. 4 and 7, so as to present convex cutting surfaces to the workpiece. In the preferred embodiment shown, the upper cutting surface 70 is defined by an 8 inch radius, and the lower cutting surface 72 is also defined by an 8 inch radius. However, the configuration illustrated is merely illustrative as various other curved configurations could be utilized with similar effect. As is evident from FIGS. 4-8, forward portions 84 and 86 of the respective blade members 12 and 14 extend laterally nearly perpendicular to the shank portions 62 and 66. This configuration facilitates the cutting of a sheet material workpiece 22 which is placed upon a flat surface such as a table and, further, minimizes the amount that the cut surfaces of the workpiece must be spread apart as they pass above and below the lower blade member 14.

Preferably, the blade members 12 and 14 are hollow ground along the surfaces 78 and 80, respectively, to ensure that the upper and lower cutting surfaces 70 and 72 have a uniform width in side elevation while providing for resharpening of the blade members, as described below. The rearward portion of the lower cutting surface 72 is provided with a relief 82 to facilitate grinding of the cutting surface 72 and to ensure smooth sliding engagement of the cutting surfaces 70 and 72 during cutting. The forward portions 84 and 86 of the blade members 12 and 14 are curved inward as shown in FIGS. 6 and 9 to form convex surfaces. This configuration of the forward portions 84 and 86 provides sufficient strength for the cutting surfaces 70 and 72 while permitting the cutting snips 10 to be maneuvered for cutting when space is limited.

Cutting of the wire workpiece 24 is provided by engagement of an anvil portion 88 formed upon the upper blade member 12 by a chisel or wedge portion 90 formed upon the lower blade member 14. The placement of the anvil portion 88 and the wedge portion 90 is such that their engagement provides a stop to limit rotation of the blade members when the cutting snips 10 are in the closed position shown in FIG. 2. The wedge portion 90 serves as a chisel to sever a wire, rod, small bar or the like placed upon the anvil portion 88 when the cutting snips 10 are moved from the open position shown in FIG. 1 to the closed position in FIG. 2. It will be appreciated that other opposed cutting surfaces such as, for example, those of "diagonal" cutters may be used in place of the anvil portion 88 and the wedge portion 90 with similar effect.

It is an important feature of the present invention that the cutting surfaces 70 and 72 may be reground to renew worn or damaged cutting surfaces. Referring to FIG. 3, it will be apparent that grinding back either the upper cutting surface 70 or the lower cutting surface 72 would normally be expected to result in a lateral space between the cutting surfaces 70 and 72, thereby precluding shearing of the sheet material workpiece 22. The offset of the cutting surface 70 with respect to the shank portion 62 is decreased by such grinding, and the offset of the cutting surface 72 with respect to the shank portion 66 is increased by such grinding. For this reason, the commercially available offset snips cannot be conveniently resharpened once they become dull or damaged.

Resharpening of the cutting snips 10 of the present invention is facilitated by pivot bosses, indicated generally by the numerals 92 and 94, upon the adjacent surfaces of the shank portions 62 and 66, respectively. The pivot bosses 92 and 94 are flat projections above the surface of the shank portions 62 and 66 perpendicular to the main pivot bolt 16. The pivot boss 92 need not be of any particular configuration but, by way of example, may include a semi-circular forward portion 96 concentric with the main pivot bolt 16 and a rectangular rearward portion 98, as shown in FIG. 4. Similarly, by way of example, the pivot boss 94 may include a semi-circular forward portion 100 concentric with the main pivot bolt 16 and a triangular rearward portion 102, as indicated in FIG. 7. The pivot bosses 92 and 94 provide improved bearing surfaces between the blade members 12 and 14 while maintaining alignment of the cutting surfaces 70 and 72. The rearward portions 98 and 102 cooperate to prevent the cutting surfaces 70 and 72 from spreading apart during the cutting stroke.

In the cutting snips 10, the offset of the cutting surfaces 70 and 72 is determined by the location of the pivot bosses 92 and 94. As a result, resharpening of the cutting snips 10 can be provided by grinding both the cutting surfaces 70 and 72 and the respective pivot bosses 92 and 94. It will be appreciated that no change in the offset of the upper cutting surface 70 will occur if equal thicknesses of material are ground from the upper cutting surface 70 and the pivot boss 92. Similarly, no change in the offset of the lower cutting surface 72 will occur if equal thicknesses of material are ground from the lower cutting surface 72 and the pivot boss 94. Thus, either or both of the blade members 12 and 14 may be sharpened as required without producing a lateral space between the cutting surfaces 70 and 72.

Resharpening of the respective blade members is further simplified because no curved surfaces require regrinding. The upper and lower cutting surfaces 70 and 72 are ground in a plane which is substantially parallel to the respective pivot bosses 92 and 94. The pivot bosses 92 and 94 may be machined first to provide reference surfaces for the grinding of the cutting surfaces 70 and 72. The hollow ground portions 78 and 80 of the respective blade members 12 and 14 eliminate the need to grind any other surfaces during resharpening. Applicant has found that sufficient regrinding capability is provided if the height of the pivot bosses 92 and 94 above the adjacent shank portions 62 and 66 is 1/32 of an inch. The articulation of the blade members 12 and 14 with respect to the handles 18 and 20 permits the cutting surfaces 70 and 72 to be positioned in a grinding fixture with the pivot bolts 26, 40 and 42 in place, only the main pivot bolt 16 having been removed.

Applicant has found that the cutting of the sheet material workpiece 22 is enhanced if the upper and lower cutting surfaces 70 and 72 are not exactly parallel with respect to the pivot bosses 92 and 94 but, instead, are angled slightly so as to establish progressive interference as the blade members are closed. Although various amounts of interference may be used with similar effect, Applicant prefers an angle of approximately 15 minutes on each of the cutting surfaces 70 and 72 so as to establish a total interference of approximately one-half a degree. This interference forces the blades tightly together during the latter part of the cutting stroke to ensure a shearing action. The desired angle and offset can be conveniently and economically formed when the blade members 12 and 14 are initially ground or subsequently reground to effect resharpening.

It will be appreciated that grinding of the pivot bosses 92 and 94 is merely illustrative of the inventive concept of removing material from the adjacent shank portions 62 and 66 of the upper and lower blade members 12 and 14 to permit resharpening of the cutting surfaces 70 and 72. Milling or other cutting means could be employed in place of grinding provided that such cutting means is not precluded by the hardness of the blade members 12 and 14. These means of cutting or removing material from the adjacent shank portions 62 and 66 of the blade members 12 and 14 to permit resharpening without changing the respective offsets of the cutting surfaces are within the purview of the present invention.

Another feature of the present invention is a locking means which can be engaged manually to prevent the cutting snips 10 from opening from the closed position shown in FIG. 2. The pivot bolt 40 is formed with a shoulder portion between the shank portion and the head portion. A lock strap 104 is pivotably mounted upon the pivot bolt 42 outside the laterally spaced side portions 44 and 46 of the upper and lower handles 18 and 20. The free end of the lock strap 104 is notched in a side portion thereof so as to form a hook surface 106. The lock strap 104 is moveable manually between the pivot bolt 40 and the handle pivot bolt 26 from a first position shown in FIG. 1 which permits operation of the cutting snips 10 to a second position shown in FIG. 2 which locks the cutting snips 10 in the closed position. In the second position, the hook surface 106 of the free end of the lock strap 104 is rotated into engagement with the shoulder portion of the pivot bolt 40 such that the lock strap 104 is held in compression by the omega spring 50. The lock strap 104 may conveniently be released or engaged by the operator's thumb to permit one-hand operation.

It is another important feature of the cutting snips 10 that a triangular notch or recess 110 is provided in the shank portion 66 of the lower blade member 14 in line with the path of the cut sheet material workpiece 22 passing above the forward portion 86 of the lower blade member 14. The recess 110 permits the cutting snips 10 to cut right-hand as well as left-hand turning cuts. It will be appreciated that the configuration of the cutting snips 10 shown in the preferred embodiment is particularly suited for straight and left-hand turning cuts. However, applicant has found that the recess 110 permits right-hand turning cuts having a 4 inch or larger diameter, thereby eliminating the need for separate cutting snips particularly adapted for right-hand turning cuts. Similar cutting snips could be provided having a mirror image configuration which would be particularly suited for straight and right-hand turning cuts yet capable of 4 inch diameter left-hand turning cuts.

It is still another important feature of the cutting snips 10 that the handles 18 and 20 are particularly convenient and adapted for applying force throughout the range of motion of the cutting blades 12 and 14. Unlike more conventional offset snips, the handle pivot bolt 26 is relatively close to the hand grips 32 and 34. As a result, the angle formed between the hand grips 32 and 34 when the cutting snips 10 are in the open position shown in FIG. 1 can be greater than that of conventional snips. In the open position, the forward portions of the hand grips 32 and 34 are spaced apart to permit the handles 18 and 20 to be spanned by the operator's hand adjacent the ear portions 36 and 38 for maximum leverage. The lower handle 20 is configured such that the open position of the lower hand grip 34 does not interfere with a work-bench upon which the sheet material workpiece 22 is placed for cutting. As the upper and lower blade members 12 and 14 are moved toward the closed position shown in FIG. 2, the more rearward portions of the upper and lower hand grips 32 and 34 are, progressively, ideally spaced apart for maximum leverage. In addition, the blade members 12 and 14 and the handles 18 and 20 comprises a four bar linkage which provides amplification in transmitting the manually applied force to the cutting surfaces 70 and 72 to reduce operator exertion and fatigue.

A variety of materials may be used to form the blade members 12 and 14 and the handles 18 and 20, depending upon the sheet material to be cut. In the preferred embodiment shown, the cutting blades 12 and 14 are forged of tool steel and are ground to the configurations shown. Such construction provides sufficient strength to permit steel sheet to be cut by the cutting snips 10. However, other materials and less expensive forming methods may be used, particularly when less substantial sheet material is to be cut. The handles 18 and 20 may be conveniently and economically formed of mild steel by various stamping operations. The lock strap 104 may also be conveniently and economically formed of sheet steel.

From the foregoing, it should be apparent that convenient and versatile offset snips have been disclosed. The offset snips can cut sheet material in both left-hand and right-hand curves without being impeded by interference of the cut material. The cutting surfaces may be conveniently and economically resharpened if the cutting surfaces become dull or damaged. The integral means for cutting wire eliminates the need for a second tool and reduces abuse of the sheet metal cutting surfaces of the offset snips. The integral locking means conveniently secures the offset snips in a safe closed position, and the handles pivot to provide particularly favorable leverage throughout the cutting stroke.

Of course, it should be understood that various changes and modifications to the preferred embodiment described above will be apparent to those skilled in the art. For example, rivets or other pivot means may be employed in place of the pivot bolts 16, 26, 40 and 42, without affecting the operation of the cutting snips. Further, changes in the configurations of the handles 18 and 20, the bosses 92 and 94, and the recess 110 may be made to adapt the cutting snips to particular applications. It is therefore intended that the foregoing detailed description be regarded as illustrative rather than limiting and that it be understood that it is the following claims, including all equivalents, that are intended to define the scope of this invention.

I claim:

1. Offset snips for cutting sheet material, comprising:
a first blade member having a substantially flat first pivot boss and a first cutting surface offset with respect to the plane of the first pivot boss;
a second blade member having a substantially flat boss and a second cutting surface offset with respect to the plane of the second pivot boss;
pivot means pivotably connecting the first and second blade members for rotation about an axis perpendicular to and through the first and second pivot bosses;
means for pivoting the first and second blade members about pivot means such that the first and second cutting surfaces are movable between an open position and a closed position for cutting sheet material therebetween;
said first pivot boss and the first cutting surface being adapted for removal of material therefrom so as to provide a resharpened cutting surface while maintaining the offset therebetween, and said second pivot boss and the second cutting surface being adapted for removal of material therefrom so as to provide a resharpened cutting surface while maintaining the offset therebetween, the first and second pivot bosses serving as reference surfaces to facilitate resharpening of the offset snips; and
means for cutting wire by pinch cutting.

2. The offset snips of claim 1 wherein the first and second pivot bosses and the first and second cutting surfaces are regrindable so as to provide resharpened cutting surfaces without altering the offset of the cutting surfaces relative to the respective pivot bosses.

3. The improved offset snips of claim 1 wherein the first and second pivot bosses are elongated in a direction substantially parallel to the first and second cutting surfaces, respectively, and opposite the first and second cutting surfaces relative to the pivot means, for increasing resistance to spreading of the first and second blade members with respect to each other during cutting of the sheet material.

4. The offset snips of claim 3, wherein the direction of the elongated bosses is such that the cutting point along the cutting surfaces, the pivot means and the contact point or area at which the pivot bosses bear against each other form in general a straight line.

5. The offset snips of claim 1 wherein the first and second blade members comprise upper and lower blade members, respectively, wherein the lower blade member includes a shank portion proximate to the pivot means, and wherein the lower blade member further includes an end portion which is angled laterally outward from the shank portion for giving support to the second cutting surface while allowing the previously cut material to pass above and below the end portion and laterally outward of the shank portion without interference therewith.

6. The offset snips of claim 5 wherein the first and second cutting surfaces are offset vertically with respect to the pivot means such that the cut material passes below the pivot means without interference therewith.

7. The offset snips of claim 5, further including recess means in the shank portion of said second blade member substantially in the place of the sheet material to be cut for receiving an edge of the cut sheet material so as to permit cutting of the sheet material along both left-hand and right-hand curves.

8. The offset snips of claim 1, wherein both of said cutting surfaces are curved in side elevation so as to provide convex cutting surfaces to a workpiece, and wherein the curves are defined by an 8" radius.

9. The offset snips of claim 1, including:
a first shank portion on said first blade member and a second shank portion on said second blade member; and
means for providing a recess in the shank portion of the second blade substantially in the plane of the sheet material to be cut for receiving an edge of the cut sheet material so as to permit cutting of the sheet material after both left-hand and right-hand curves.

10. The offset snips of claim 9, further including
an elongated first handle member pivotably connected to the first blade member adjacent one end of the first handle member;
an elongated second handle member pivotably connected to the second blade member adjacent one end of the second handle member; and
handle pivot means pivotably connecting the first and second handle members intermediately of the ends thereof, the pivot means being offset with respect to the ends of the handle members such that movement of the free ends of the handle members toward each other spreads pivotable connections between the handle members and the respective blade members and pivots the first and second cutting surfaces from the open position to the closed position; and the range of movement of the first and second handle members is located on one side of the plane of the sheet material so as to avoid interference with the previously cut sheet material.

11. The offset snips of claim 10, further comprising biasing means for biasing the free ends of the first and second handle members away from each other such that the first and second cutting surfaces are biased into an open position; and a lock member comprising a strap with a hook surface pivotably mounted to one of said blade members with one of the pivotable connections which is mounted in the other of said blade members, said hook surface being biased into engagement with the other of said blade members by said biasing means when said first and second cutting surfaces are in the closed position and the hook surface of said strap is positioned over said one of the pivotable connections between the handle members and the blade members.

12. The offset snips of claim 10, wherein the height of said pivot bosses above the adjacent shank portions is about 1/32 of an inch.

13. The offset snips of claim 10, wherein said cutting surfaces are not exactly parallel with respect to said pivot bosses, and are angled slightly so as to provide progressive interference as said blade members are closed.

14. The offset snips of claim 13, wherein said angle is approximately 15 minutes on each of said cutting surfaces, and the total interference is approximately ½ a degree.

15. The offset snips of claim 9, wherein said means for providing a recess enables said snips to cut an opposite turning cut depending on whether said snips is a right or left handled tool to at least a diameter as small as 4" without using the upper blade member as a mold board.

16. The offset snips of claim 10, further comprising biasing means for biasing the free ends of the first and second handle members away from each other so that the first and second cutting surfaces are biased into an open position; and said biasing means comprising a spring having a plurality of coils and a sleeve disposed within the coils so as to substantially extend the cycle life of said spring.

17. The offset snips of claim 10, wherein said blade members and said handle members comprise a four bar linkage which provides amplification in transmitting manually applied force to the cutting surfaces.

18. The offset snips of claim 17, wherein said four bar linkage enables the handle members to be closer together and have a smaller angle therebetween as compared to conventional offset snips, thereby facilitating a stronger and more comfortable grip of said handle members.

19. Offset snips for cutting sheet material, comprising:
a first blade member having a substantially flat first pivot boss and having a first shank portion and a first cutting surface offset with respect to the first shank portion;
a second blade member having a substantially flat boss and having a second shank portion and a second cutting surface offset with respect to the second shank portion;
pivot means pivotably connecting the first and second blade members for rotation about an axis perpendicular to and through the first and second pivot bosses and said second shank portion; means for pivoting the first and second blade members about the pivot means such that the first and second cutting surfaces are movable between an open position and a closed position for cutting the sheet material therebetween;
said first and second pivot bosses serving as reference surfaces to facilitate resharpening of said offset snips; and said pivot bosses and said first and second cutting surfaces being adapted for removal of material therefrom so as to provide a resharpened cutting surface while maintaining the offset therebetween; and
opposed supplementary pinch point type of cutting surfaces upon the first and second blade members movable by the pivoting means between an open position and a closed position for cutting wire and the like therebetween.

20. The offset snips of claim 19 wherein engagement of the opposed supplementary cutting surfaces provides a stop limiting the rotation of the first blade member relative to the second blade member in the closed position.

21. The offset snips of claim 19 wherein the opposed supplementary cutting surfaces comprise an anvil means and an opposing chisel means.

* * * * *